US010819896B1

(12) United States Patent
Tan (10) Patent No.: US 10,819,896 B1
(45) Date of Patent: Oct. 27, 2020

(54) COMPUTER READABLE RECORDING MEDIUM CAN PERFORM IMAGE SENSING SYSTEM CONTROL METHOD AND IMAGE SENSING SYSTEM

(71) Applicant: PixArt Imaging Inc., Hsin-Chu (TW)

(72) Inventor: Zi Hao Tan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/411,081

(22) Filed: May 13, 2019

(51) Int. Cl.
| | |
|---|---|
| *G09G 5/00* | (2006.01) |
| *H04N 5/232* | (2006.01) |
| *G06T 7/246* | (2017.01) |
| *G06F 3/0354* | (2013.01) |
| *G06F 3/03* | (2006.01) |
| *G06T 7/73* | (2017.01) |

(52) U.S. Cl.
CPC .......... *H04N 5/232* (2013.01); *G06F 3/0304* (2013.01); *G06F 3/03543* (2013.01); *G06T 7/248* (2017.01); *G06T 7/74* (2017.01)

(58) Field of Classification Search
CPC ........ H04N 5/232; H04N 19/132; G06T 7/74; G06T 7/248; G06T 11/40; G06F 3/03543; G06F 3/0412; G06F 3/0416; G06F 3/038; G06F 3/0304

USPC .......................................................... 345/166
See application file for complete search history.

(56) References Cited

U.S. PATENT DOCUMENTS

2015/0301618 A1 * 10/2015 Tan .................. G06F 3/0304
345/166
2015/0301630 A1 * 10/2015 Lee .................. G06F 3/0383
345/163

* cited by examiner

*Primary Examiner* — Jennifer T Nguyen
(74) *Attorney, Agent, or Firm* — Winston Hsu (57) ABSTRACT

An image sensing system control method, comprises: (a) calculating a first motion delta between a first image frame and a second image frame following the first image frame by the image sensor; (b) calculating a first output motion delta according to a first time difference, a second time difference and the first motion delta by the image sensor if the image sensor receives a first polling from the control circuit, wherein the first time difference means a time difference between a time of the first polling and a time of the first image frame, and the second time difference means a time difference between a time of the first polling and a time of the second image frame; and (c) outputting the first output motion delta to the control circuit from the image sensor.

24 Claims, 4 Drawing Sheets

FIG. 6

COMPUTER READABLE RECORDING MEDIUM CAN PERFORM IMAGE SENSING SYSTEM CONTROL METHOD AND IMAGE SENSING SYSTEM

BACKGROUND OF THE INVENTION

1. Field of the Invention

The present invention relates to an image sensing system control method and an image sensing system, and particularly relates to an image sensing system control method and an image sensing system which can reduce the effect caused by non-synchronization between the frame rate and the MCU polling.

2. Description of the Prior Art

In an optical pointing device such as an optical mouse, the image sensor thereof captures image frames at a predetermined frame rate and then computes the motion delta between different image frames. Such predetermined frame rate may change corresponding to different modes, for example, an active mode or a standby mode. Also, a MCU (micro control unit) polls the image sensor for motion delta (i.e. request the image sensor to output motion delta). However, the MCU polling rate and the image sensor frame rate are usually different and non-synchronized with each other. As a result, motion delta output and MCU polling will never be consistent.

Figure 1:
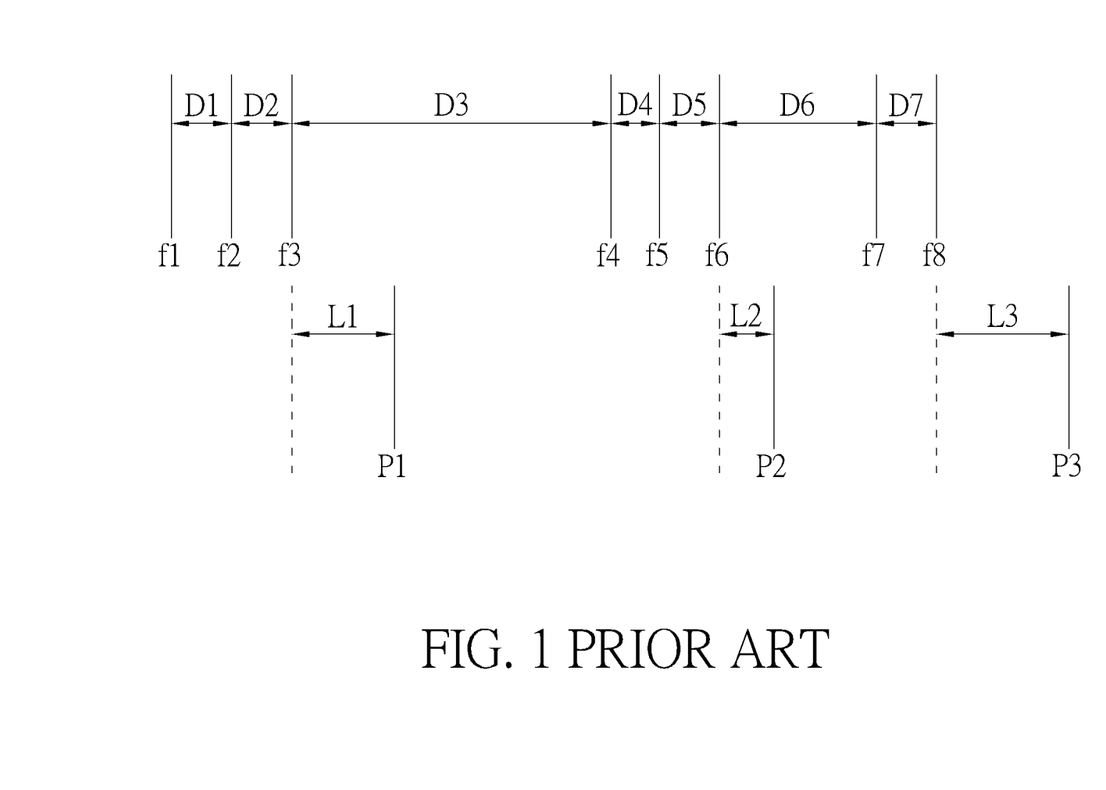
FIG. 1 is a schematic diagram illustrating the non-synchronization between the frame rate and the MCU polling in prior art.

FIG. 1 is a schematic diagram illustrating the non-synchronization between the frame rate and the MCU polling in prior art. As illustrated in FIG. 1, image frames f1, f2 ... f8 are captured by an image sensor, and motion delta D1, D2 ... between different image frames are respectively computed by the image sensor. Also, a MCU coupled to the image sensor generates pollings P1-P3 to request motion delta.

For more details, the image sensor outputs motion delta D1, D2 to the MCU responding to the polling P1, outputs motion deltas D3, D4, D5 to the MCU responding to the polling P2, and outputs motion deltas D6, D7 to the MCU responding to the polling P3. However, due to the non-synchronization, the pollings P1, P2, P3 respectively has different latencies L1, L2, L3 from the image frames f3, f6, and f8. Also, due to the non-synchronization, the MCU may receive different numbers of motion deltas responding to different pollings. For example, the MCU receives two motion deltas D1, D2 for the polling P1, but receives three motion deltas D3, D4, D5 for the polling P2. Further, the motion delta is not immediately output to the MCU, for example, the motion delta D3 is output responding the poling P2 rather than the polling P1.

Since the motion deltas are always applied to compute a position of the optical pointing device, the issues illustrated in FIG. 1 may affect the accuracy of position computing.

SUMMARY OF THE INVENTION

Therefore, one objective of the present invention is to provide an image sensing system control method can reduce the affect caused by non-synchronization between the frame rate and the polling.

one objective of the present invention is to provide an image sensing system control method can reduce the affect caused by non-synchronization between the frame rate and the polling.

One embodiment of the present invention provides a non-transitory computer readable recording medium comprising at least one program code recorded therein, an image sensing system control method applied to an image sensing system comprising an image sensor and a control circuit can be performed when the program code is executed. The image sensing system control method comprises: (a) calculating a first motion delta between a first image frame and a second image frame following the first image frame by the image sensor; (b) calculating a first output motion delta according to a first time difference, a second time difference and the first motion delta by the image sensor if the image sensor receives a first polling from the control circuit, wherein the first time difference means a time difference between a time of the first polling and a time of the first image frame, and the second time difference means a time difference between a time of the first polling and a time of the second image frame; and (c) outputting the first output motion delta to the control circuit from the image sensor.

Another embodiment of the present invention provides an image sensing system comprising: a control circuit; an image sensor, configured to perform: (a) calculating a first motion delta between a first image frame and a second image frame following the first image frame; (b) calculating a first output motion delta according to a first time difference, a second time difference and the first motion delta by the image sensor if receives a first polling from the control circuit, wherein the first time difference means a time difference between a time of the first polling a time of the first image frame, and the second time difference means a time difference between a time of the first polling and a time of the second image frame; and (c) outputting the first output motion delta to the control circuit from the image sensor.

In view of above-mentioned embodiments, the motion delta can be output corresponding to the time difference between a time of the image frame and a time of the polling, thus can reduce the affect caused by non-synchronization between the frame rate and the polling.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. The components in each embodiment can be implemented by hardware (e.g. a circuit or a device), or by firmware (such as a processor installed with at least one program). Further, the components in each embodiment can be separated into more components or be integrated to fewer components. Additionally, the term "first", "second" . . . in following descriptions are only for distinguishing elements or steps, but do not mean to limit the sequence thereof.

Figure 2:
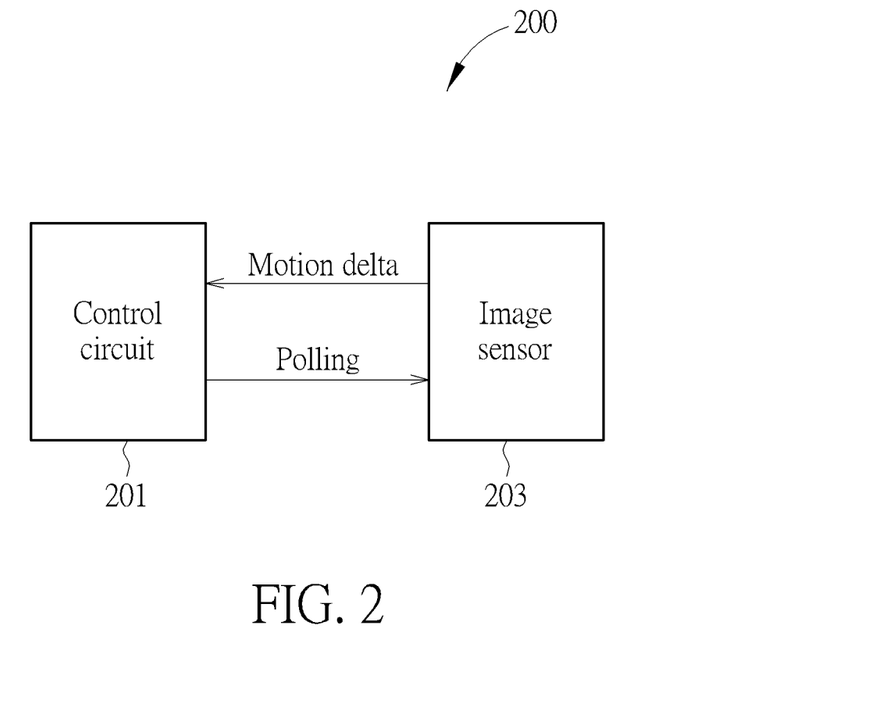
FIG. 2 is a block diagram illustrating an image sensing system according to one embodiment of the present invention.

FIG. 2 is a block diagram illustrating an image sensing system 200 according to one embodiment of the present invention. As illustrated in FIG. 2, the image sensing system 200 comprises a control circuit 201 and an image sensor 203. The control circuit 201 can be above-mentioned MCU or any other device can perform the same function, such as a processor. The image sensor 203 is configured to capture a plurality of image frames and to compute motion deltas between different image frames. The control circuit 201 generates pollings to the image sensor 203, and the image sensor 203 outputs motions deltas responding to the pollings.

Figure 3:
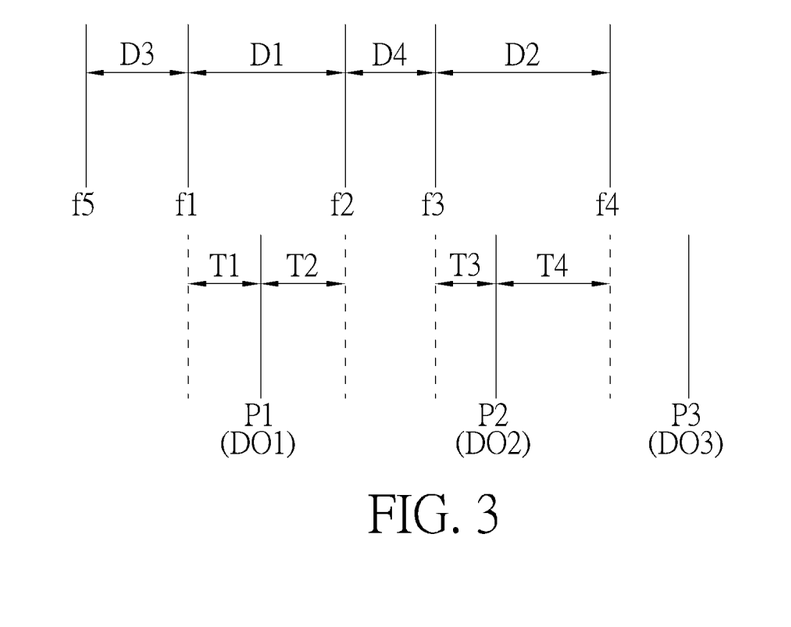
FIG. 3-FIG. 5 are schematic diagrams illustrating image sensing system control methods according to different embodiments of the present invention.
Figure 4:
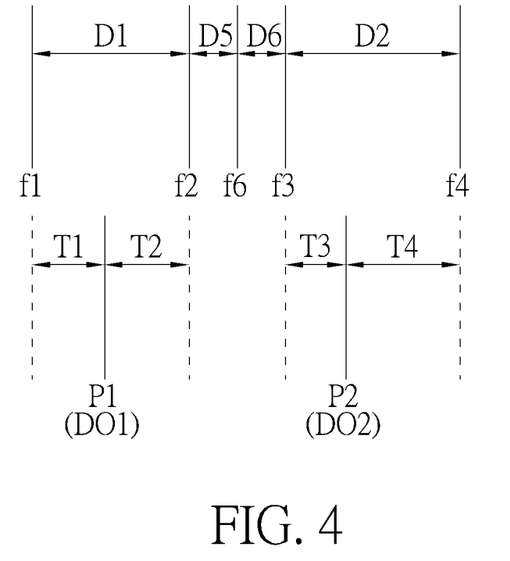
Figure 5:
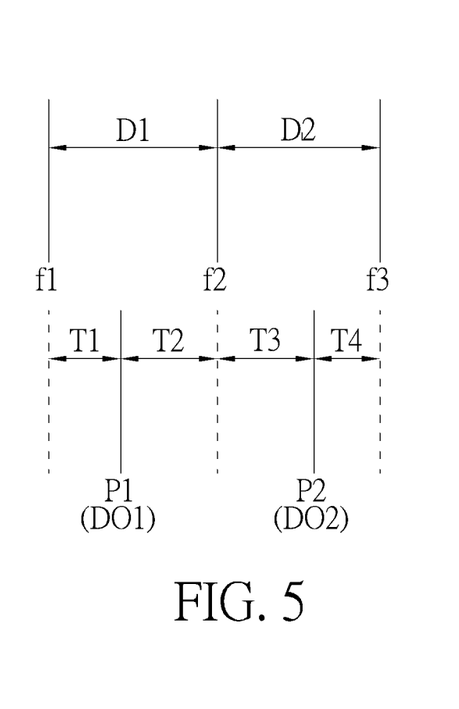

FIG. 3-FIG. 5 are schematic diagrams illustrating image sensing system control methods according to different embodiments of the present invention, which also mean the operations of the image sensing system 200 according to different embodiments of the present invention.

As illustrated in FIG. 3, the image sensor 203 captures a first image frame f1, a second image frame f2, a third image frame f3 and a fourth image frame f4. Also, the image sensor 203 computes a first motion delta D1 between the first image frame f1 and the second image frame f2, a second motion delta D2 between the third image frame f3 and the fourth image frame f4, a third motion delta D3 between the fifth image frame f5 and the first image frame f1, and a fourth motion delta D4 between the second image frame f2 and the third image frame f3. The image sensor 203 computes a first output motion delta Do1 according to a first time difference T1, a second time difference T2 and the first motion delta D1 if it receives the first polling P1. The first time difference T1 means a time difference between a time of the first polling P1 and a time of the first image frame f1, and the second time difference T2 means a time difference between a time of the first polling P1 and a time of the second image frame f2. Further, the image sensor 203 computes the first output motion delta Do1 according to the third motion delta D3.

Specifically, the image sensor 203 computes the first output motion delta Do1 according to a function of $$D1 \times \frac{T1}{T1+T2},$$

and outputs $$D1 \times \frac{T1}{T1+T2} + D3$$

as the first output motion delta Do1. That is, the image sensor 203 outputs a complete motion delta to the control circuit 201 if the motion delta corresponds to image frames captured before the polling and not requested by another polling (e.g. D3), and outputs partial motion delta if the motion delta corresponds to an image frame captured before the polling and an image frame captured after the polling (e.g. D1). If the embodiment in FIG. 1 does not have the fifth image frame f5, the image sensor 203 outputs $$D1 \times \frac{T1}{T1+T2}$$

as the first output motion delta Do1 rather than $$D1 \times \frac{T1}{T1+T2} + D3.$$

In one embodiment, the image sensor 203 outputs the output motion delta to the control circuit 201 at a time that the image sensor receives a next polling. For example, in the embodiment of FIG. 3, the image sensor 203 outputs the first output motion delta Do1, which corresponds the first polling P1, to the control circuit 201 at a time that the image sensor receives the second polling P2. However, the present invention does not limit that the image sensor 203 outputs the output motion delta at a time that the image sensor receives a next polling. For example, the image sensor 203 can output the output motion delta after the first polling P1 for a predetermined time period. Further, in one embodiment, the image sensor 203 computes the output motion delta corresponding to a polling at the time of an image frame following the polling. For example, the control circuit 201 computes the first motion delta Do1 corresponding to the first polling P1 at a time of the second image frame f2 following the first polling P1.

Responding to the second polling P2, the control circuit 201 computes the second output motion delta Do2 according to the first time difference T1, the second time difference T2, the first motion delta D1, a third time difference T3, a fourth time difference T4 and the second motion delta D2. The third time difference T3 means a time difference between the time of the second polling P2 and the time of the third image frame f3, and the fourth time difference T4 means a time difference between the time of the second polling P2 and the time of the fourth image frame f4.

Specifically, the control circuit 201 computes the second output motion delta DO2 according to a function of $$D1 \times \frac{T2}{T1+T2}$$

and a function of $$D2 \times \frac{T3}{T3+T4},$$

and outputs $$D1 \times \frac{T2}{T1+T2} + D4 + D2 \times \frac{T3}{T3+T4}$$

as the second output motion delta Do2. That is, the image sensor 203 outputs a complete motion delta to the control circuit 201 if the motion delta correspond to image frames captured before the polling and not requested by another polling (e.g. D4), and outputs partial motion delta if the motion delta correspond to an image frame captured before the polling and an image frame captured after the polling (e.g. D2). Further, the image sensor 203 outputs the remaining motion delta to the control circuit 201 if partial of the motion delta is output as a previous output motion delta. For example, the image sensor 203 outputs partial of the first motion delta D1

$$\left(D1 \times \frac{T1}{T1+T2}\right)$$

responding to the first polling P1, and outputs partial of the first motion delta $$D1\left(D1 \times \frac{T2}{T1+T2}\right)$$

responding to the second polling P2.

The above-mentioned rules can be independently used or combined. FIG. 4 is a schematic diagram illustrating an image sensing system control method according to another embodiment of the present invention. Following the above-mentioned rules, in the embodiment of FIG. 4, the image sensor 203 outputs $$D1 \times \frac{T1}{T1+T2}$$

as the first output motion delta Do1, and outputs $$D1 \times \frac{T2}{T1+T2} + D5 + D6 + D2 \times \frac{T3}{T3+T4}$$

as the second output motion delta Do2. D5 is a fifth motion delta between the second image frame f2 and a sixth image frame f6, and D6 is a sixth motion delta between the third image frame f3 and the sixth image frame f6. The sixth image frame f6 follows the second image frame f2 and is previous to the third image frame f3.

FIG. 5 is a schematic diagram illustrating an image sensing system control method according to another embodiment of the present invention. In FIG. 5, the image sensor 203 computes a first motion delta D1 between a first image frame f1 and a second image frame f2, and computes the second motion delta D2 between the second image frame f2 and a third image frame f3 following the second image frame f2. Following above-mentioned rules, the image sensor 203 outputs $$D1 \times \frac{T2}{T1+T2}$$

as the first output motion delta Do1 responding to the first polling P1. Also, the image sensor 203 outputs $$D1 \times \frac{T2}{T1+T2} + D2 \times \frac{T3}{T3+T4}$$

as the second output motion delta Do2 responding to the second polling P2.

In above-mentioned embodiment, the time differences between each group of two continuous pollings are the same. Take FIG. 3 for example, a time difference between the first polling P1 and the second polling P2 and a time difference between the second polling P2 and a third polling P3 following the second polling P2 are the same. For more detail, the image sensor 203 outputs a second output delta DO2 to the control circuit 201 if receives the second polling P2 following the first polling P1, and outputs a third output delta Do3 to the control circuit 201 if receives the third polling P3 following the second polling P2. The control circuit 201 generates no polling to the image sensor 203 between the first polling P1 and the second polling P2 and between the second polling P2 and the third polling P3.

Figure 6:
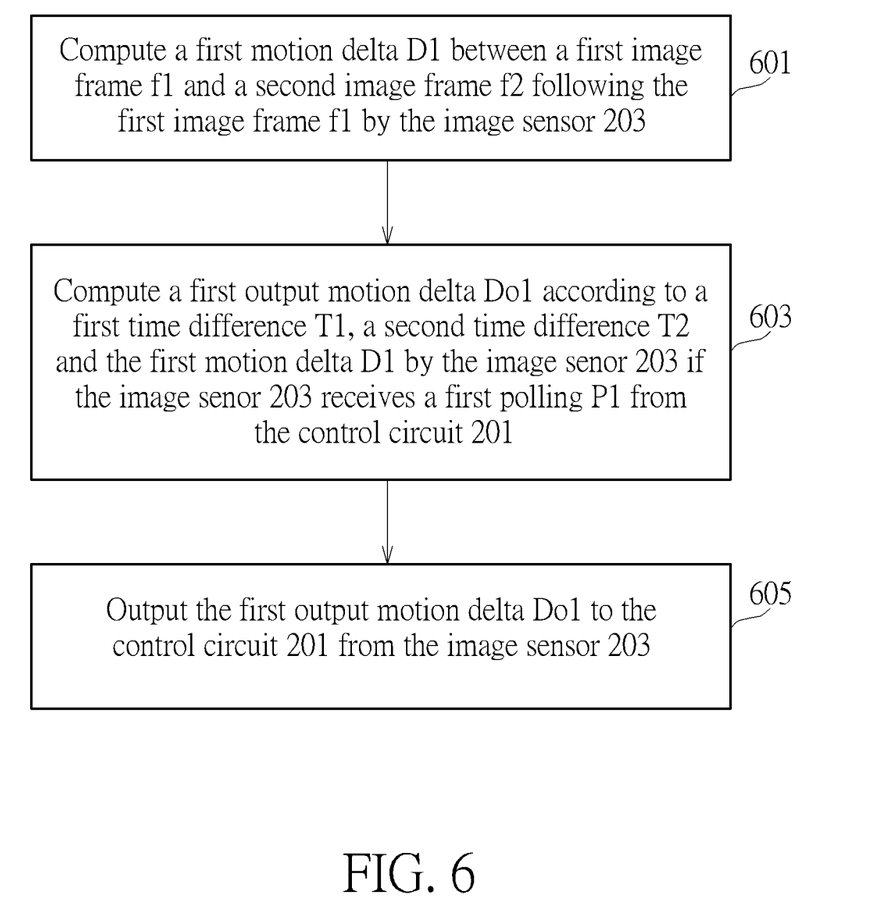
FIG. 6 is a flow chart illustrating an image sensing system control method according to one embodiment of the present invention.

In view of above-mentioned embodiments, an image sensing system control method can be acquired, which can be performed by at least one program recorded in a non-transitory computer readable recording medium such as an optical disc, a hard disk or a memory card. FIG. 6 is a flow chart illustrating an image sensing system control method according to one embodiment of the present invention, which comprises following steps:

Step 601

Compute a first motion delta D1 between a first image frame f1 and a second image frame f2 following the first image frame f1 by the image sensor 203.

Step 603

Compute a first output motion delta Do1 according to a first time difference T1, a second time difference T2 and the first motion delta D1 by the image sensor 203 if the image sensor 203 receives a first polling P1 from the control circuit 201.

The first time difference T1 means a time difference between a time of the first polling P1 and a time of the first image frame f1, and the second time difference T2 means a time difference between a time of the first polling P1 and a time of the second image frame f2.

Step 605

Output the first output motion delta Do1 to the control circuit 201 from the image sensor 203.

In view of above-mentioned embodiments, the motion delta can be output corresponding to the time difference between a time of the image frame and a time of the polling, thus can reduce the affect caused by non-synchronization between the frame rate and the polling.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium comprising at least one program code recorded therein, an image sensing system control method applied to an image sensing system comprising an image sensor and a control circuit can be performed when the program code is executed, the image sensing system control method comprising:
   (a) calculating a first motion delta between a first image frame and a second image frame following the first image frame by the image sensor;
   (b) calculating a first output motion delta according to a first time difference, a second time difference and the first motion delta by the image sensor if the image sensor receives a first polling from the control circuit, wherein the first time difference means a time difference between a time of the first polling and a time of the first image frame, and the second time difference means a time difference between a time of the first polling and a time of the second image frame; and
   (c) outputting the first output motion delta to the control circuit from the image sensor.

2. The non-transitory computer readable recording medium of claim 1, wherein the step (b) computes the first output motion delta according to a function of $$D1 \times \frac{T1}{T1+T2},$$

wnerein D1 is the first motion delta, T1 is the first time difference and T2 is the second time difference.

3. The non-transitory computer readable recording medium of claim 2, further comprising:
calculating a third motion delta between the first image frame and a fifth image frame before the first image by the image sensor;
wherein the step (b) computes the first output motion delta according to the function of $$D1 \times \frac{T1}{T1+T2}$$

and the third motion delta.

4. The non-transitory computer readable recording medium of claim 1, further comprising:
(d) calculating a second motion delta between a third image frame following the second image frame and a fourth image frame following the third image by the image sensor;
(e) calculating a second output motion delta according to the first time difference, the second time difference, the first motion delta, a third time difference, a fourth time difference and the second motion delta by the image sensor if the image sensor receives a second polling from the control circuit, wherein the third time difference means a time difference between a time of the second polling and a time of the third image frame, and the fourth time difference means a time difference between a time of the second polling and a time of the fourth image frame; and
(f) outputting the second output motion delta to the control circuit by the image sensor.

5. The non-transitory computer readable recording medium of claim 4, wherein the step (e) computes the second output motion delta according to a function of $$D1 \times \frac{T2}{T1+T2}$$

and a function of $$D2 \times \frac{T3}{T3+T4},$$

wherein D1 is the first motion delta, T1 is the first time difference, T2 is the second time difference, D2 is the second motion delta, T3 is the third time difference, and T4 is the fourth time difference.

6. The non-transitory computer readable recording medium of claim 5, further comprising:
calculating a fourth motion delta between the second image frame and the third image frame by the image sensor;
wherein the step (b) computes the second output motion delta according to the function of $$D1 \times \frac{T2}{T1+T2},$$

the function of $$D2 \times \frac{T3}{T3+T4}$$

and the fourth motion delta.

7. The non-transitory computer readable recording medium of claim 5, further comprising:
calculating a fifth motion delta between the second image frame and a six image frame by the image sensor, wherein the six image frame follows the second image frame and is previous to the third image frame;
calculating a sixth motion delta between the sixth image frame and the third image frame;
wherein the step (b) computes the second output motion delta according to the function of $$D1 \times \frac{T2}{T1+T2},$$

the function of $$D2 \times \frac{T3}{T3+T4},$$

the fifth motion delta and the sixth motion delta.

8. The non-transitory computer readable recording medium of claim 1, further comprising:
(d) calculating a second motion delta between a third image frame following the second image frame and the second image frame by the image sensor;
(e) calculating a second output motion delta according to the first time difference, the second time difference, the first motion delta, a third time difference, a fourth time difference and the second motion delta by the image sensor if the image sensor receives a second polling from the control circuit, wherein the third time difference means a time difference between a time of the second polling and a time of the second image frame, and the fourth time difference means a time difference between a time of the second polling and a time of the third image frame; and
(f) outputting the second output motion delta to the control circuit by the image sensor.

9. The non-transitory computer readable recording medium of claim 8, wherein the step (e) computes the second output motion delta according to a function of $$D1 \times \frac{T2}{T1+T2}$$

and a function of $$D2 \times \frac{T3}{T3+T4},$$

wherein D1 is the first motion delta, T1 is the first time difference, T2 is the second time difference, D2 is the second motion delta, T3 is the third time difference, and T4 is the fourth time difference.

10. The non-transitory computer readable recording medium of claim 1, wherein step (b) computes the first output motion delta at the time of the second image frame.

11. The non-transitory computer readable recording medium of claim 1, wherein the step (c) outputs the first output motion delta to the control circuit at a time that the image sensor receives a next polling.

12. The non-transitory computer readable recording medium of claim 1, wherein the image sensor outputs a second output motion delta to the control circuit if receives a second polling following the first polling, and outputs a third output motion delta to the control circuit if receives a third polling following the second polling, wherein the control circuit generates no polling to the image sensor between the first polling and the second polling and between the second polling and the third polling, wherein a time difference between a time of generating the first polling and a time of generating the second polling is identical to a time difference between a time of generating the second polling and a time of generating the third polling.

13. An image sensing system, comprising:
a control circuit;
an image sensor, configured to perform:
(a) calculating a first motion delta between a first image frame and a second image frame following the first image frame;
(b) calculating a first output motion delta according to a first time difference, a second time difference and the first motion delta by the image sensor if receives a first polling from the control circuit, wherein the first time difference means a time difference between a time of the first polling a time of the first image frame, and the second time difference means a time difference between a time of the first polling and a time of the second image frame; and
(c) outputting the first output motion delta to the control circuit from the image sensor.

14. The image sensing system of claim 13, wherein step (b) computes the first output motion delta according to a function of $$D1 \times \frac{T1}{T1+T2},$$

wherein D1 is the first motion delta, T1 is the first time difference and T2 is the second time difference.

15. The image sensing system of claim 14, wherein the image sensor is further configured to perform:
calculating a third motion delta between the first image frame and a fifth image frame before the first image by the image sensor;
wherein the step (b) computes the first output motion delta according to the function of $$D1 \times \frac{T1}{T1+T2}$$

and the third motion delta.

16. The image sensing system of claim 13, wherein the image sensor is further configured to perform:
(d) calculating a second motion delta between a third image frame following the second image frame and a fourth image frame following the third image by the image sensor;
(e) calculating a second output motion delta according to the first time difference, the second time difference, the first motion delta, a third time difference, a fourth time difference and the second motion delta by the image sensor if the image sensor receives a second polling from the control circuit, wherein the third time difference means a time difference between a time of the second polling and a time of the third image frame, and the fourth time difference means a time difference between a time of the second polling and a time of the fourth image frame; and
(f) outputting the second output motion delta to the control circuit by the image sensor.

17. The image sensing system of claim 16, wherein the step (e) computes the second output motion delta according to a function of $$D1 \times \frac{T2}{T1+T2}$$

and a function of $$D2 \times \frac{T3}{T3+T4},$$

wherein D1 is the first motion delta, T1 is the first time difference, T2 is the second time difference, D2 is the second motion delta, T3 is the third time difference, and T4 is the fourth time difference.

18. The image sensing system of claim 17, wherein the image sensor is further configured to perform:
calculating a fourth motion delta between the second image frame and the third image frame by the image sensor;
wherein the step (b) computes the second output motion delta according to the function of $$D1 \times \frac{T2}{T1+T2},$$

the function of $$D2 \times \frac{T3}{T3+T4}$$

and the fourth motion delta.

19. The image sensing system of claim 17, wherein the image sensor is further configured to perform:
calculating a fifth motion delta between the second image frame and a six image frame by the image sensor, wherein the six image frame follows the second image frame and is previous to the third image frame;
calculating a sixth motion delta between the sixth image frame and the third image frame;
wherein the step (b) computes the second output motion delta according to the function of $$D1 \times \frac{T2}{T1+T2},$$

the function of $$D2 \times \frac{T3}{T3+T4},$$

the fifth motion delta and the sixth motion delta.

20. The image sensing system of claim 13, wherein the image sensor is further configured to perform:
(d) calculating a second motion delta between a third image frame following the second image frame and the second image frame by the image sensor;
(e) calculating a second output motion delta according to the first time difference, the second time difference, the first motion delta, a third time difference, a fourth time difference and the second motion delta by the image sensor if the image sensor receives a second polling from the control circuit, wherein the third time difference means a time difference between a time of the second polling and a time of the second image frame, and the fourth time difference means a time difference between a time of the second polling and a time of the third image frame; and
(f) outputting the second output motion delta to the control circuit by the image sensor.

21. The image sensing system of claim 20, wherein the step (e) computes the second output motion delta according to a function of $$D1 \times \frac{T2}{T1+T2}$$

and a function of $$D2 \times \frac{T3}{T3+T4},$$

wherein D1 is the first motion delta, T1 is the first time difference, T2 is the second time difference, D2 is the second motion delta, T3 is the third time difference, and T4 is the fourth time difference.

22. The image sensing system of claim 13, wherein step (b) computes the first output motion delta at the time of the second image frame.

23. The image sensing system of claim 13, wherein the step (c) outputs the first output motion delta to the control circuit at a time that the image sensor receives a next polling.

24. The image sensing system of claim 13, wherein the image sensor outputs a second output motion delta to the control circuit if receives a second polling following the first polling, and outputs a third output motion delta to the control circuit if receives a third polling following the second polling, wherein the control circuit generates no polling to the image sensor between the first polling and the second polling and between the second polling and the third polling, wherein a time difference between a time of generating the first polling and a time of generating the second polling is identical to a time difference between a time of generating the second polling and a time of generating the third polling.

* * * * *